United States Patent
Grosse-Puppendahl et al.

[11] Patent Number: 6,162,385
[45] Date of Patent: Dec. 19, 2000

[54] COMPOSITE COMPRISING A POLYAMIDE-BASED MOLDING COMPOSITION AND VULCANIZED FLUOROELASTOMERS

[75] Inventors: Thomas Grosse-Puppendahl; Friedrich Georg Schmidt, both of Haltern, Germany

[73] Assignee: Huels Aktiengesellschaft, Marl, Germany

[21] Appl. No.: 09/052,986

[22] Filed: Apr. 1, 1998

[30] Foreign Application Priority Data

May 2, 1997 [DE] Germany .................. 197 18 504

[51] Int. Cl.$^7$ .................. B29C 39/12; B32B 7/10
[52] U.S. Cl. .................. 264/250; 264/255; 264/259; 264/263; 264/266; 264/331.14; 264/331.19; 428/421
[58] Field of Search .................. 264/250, 255, 264/266, 331.14, 331.13, 331.19, 259, 263, 328.8; 156/307.7; 428/420, 474.4, 477.7, 688, 689, 421, 422, 36.91

[56] References Cited

U.S. PATENT DOCUMENTS

| | | | |
|---|---|---|---|
| 4,339,553 | 7/1982 | Yoshimura et al. | 524/544 |
| 5,132,182 | 7/1992 | Grosse-Puppendahl et al. | 428/475.8 |
| 5,554,425 | 9/1996 | Krause et al. | 428/36.91 |

FOREIGN PATENT DOCUMENTS

| | | |
|---|---|---|
| 0 024 120 | 2/1981 | European Pat. Off. . |
| 0 147 874 | 7/1985 | European Pat. Off. . |
| 0 344 427 | 12/1989 | European Pat. Off. . |
| 0 629 653 | 12/1994 | European Pat. Off. . |
| 0 767 190 A1 | 4/1997 | European Pat. Off. . |
| 2510096 | 9/1975 | Germany . |
| 30 27 104 | 2/1981 | Germany . |
| 1 504 438 | 3/1978 | United Kingdom . |

*Primary Examiner*—Mathieu D. Vargot
*Assistant Examiner*—Suzanne E. McDowell
*Attorney, Agent, or Firm*—Oblon, Spivak, McClelland, Maier & Neustadt, P.C.

[57] ABSTRACT

Composite comprising a polyamide-based molding composition and vulcanized fluoroelastomers. Composite articles comprising at least two subcomponents which are firmly joined to one another which comprise i) a vulcanizate and ii) a polyamide containing thermoplastic wherein a) said polyamide containing thermoplastic comprises at least 30% by weight of polyamide and in said polyamide at least 30% of the end groups are amino end groups and b) said vulcanizate is produced by vulcanization of a fluororubber compound while in contact with said polyamide containing thermoplastic.

34 Claims, No Drawings

COMPOSITE COMPRISING A POLYAMIDE-BASED MOLDING COMPOSITION AND VULCANIZED FLUOROELASTOMERS

BACKGROUND OF THE INVENTION

1. Field of the Invention

The invention relates to a method of producing a firm bond between a rigid subcomponent which comprises a polyamide containing thermoplastic composition and a flexible subcomponent comprising a vulcanized fluoroelastomer. The invention also relates to the articles obtained by this method.

2. Discussion of the Background

Composite materials comprising stiff thermoplastic molded materials and rubber-elastic molding materials are customarily joined together by adhesive bonding, screwing, mechanical interlocking or using a coupling agent. Recently, interesting methods of producing composites comprising a polyamide-based molding and a vulcanizate have been developed. Thus, EP-A-0 344 427 describes the production of a composite comprising polyamide and a rubber containing carboxyl or anhydride groups, while in EP-A-0 629 653 the rubber compound contains an unsaturated silane. The adhesive strengths achieved are notable but the method has some disadvantages. Thus, if the concentration of reactive groups in the rubber compound is relatively high, undesired adhesion to the metal mold customarily used in vulcanization can occur. In addition, for some applications it is extremely disadvantageous that the resistance of the elastomers used toward oils, fats, solvents and fuels, e.g. supergrade gasoline, diesel or alcohol-containing fuels is unsatisfactory, particularly at high temperatures.

Objects of the invention are therefore, starting out from the abovementioned prior art, as follows:

Use should be made of a commercial rubber which does not have to be additionally functionalized or modified and also requires no specific additions of reactive agents;

in the production process, the composite bodies should have no undesirable adhesion to the walls of the mold and should therefore be able to be removed from the mold without problems, furthermore, the vulcanizate should be resistant to oils, fats, solvents and fuels over a wide temperature range, finally, the adhesion at the phase interface of the composite should not be adversely affected by contact with oils, fats, solvents or fuels over a wide temperature range and over a long period of time.

SUMMARY OF THE INVENTION

These objects are achieved by a method of producing articles comprising at least two subcomponents which are firmly joined to one another which comprises i) a vulcanizate and ii) a polyamide containing thermoplastic wherein said polyamide containing thermoplastic comprises at least 30% by weight of polyamide and in said polyamide at least 30% of the end groups are amino end groups;

comprising vulcanizing a fluororubber compound while in contact with said polyamide containing thermoplastic.

In a preferred embodiment, at least 50% and very preferably at least 70% of the end groups in the polyamide are amino end groups.

DETAILED DESCRIPTION OF THE PREFERRED EMBODIMENTS

For the purposes of the present invention, a polyamide containing thermoplastic composition contains a polyamide which is a high molecular weight compound which has —CO—NH— linkages in the main chain. The polyamide containing thermoplastic composition comprises at least 30 wt. % of polyamide, preferably at least 40 wt. %, more preferably at least 50 wt. %, based on the weight of said polyamide containing thermoplastic composition. The polyamide containing thermoplastic composition may comprise 100 wt. % of polyamide, $\leq$90 wt. %, $\leq$80 wt. %, based on the weight of said polyamide containing thermoplastic composition. Polyamides are generally obtained from diamines and dicarboxylic acids or from aminocarboxylic acids by polycondensation or from lactams by polymerization. Possible polyamides are all those which can be melted by heating. The polyamides can also comprise further constituents which are built in by polycondensation, for example polyether glycols or polyether diamines. Examples of suitable polyamides are PA 46, PA 6, PA 66, PA 610, PA 612, PA 1012, PA 11, PA 12, PA 1212, PA 6.3-T and PEBA and also mixtures thereof. Such polyamides and preparation methods are conventionally known in the art.

The type and concentration of the end groups in the polyamide can be varied in a known manner by regulation of the molecular weight. If an excess of amino end groups is desired, regulation is advantageously carried out using a small amount of a diamine. This is a conventional practice for a person skilled in the art.

For the purposes of the present invention, a polyamide containing thermoplastic composition may be a polyamide molding composition which is a polyamide preparation which has been formulated for improving the processing properties or for modifying the use properties. Polyamide molding compositions may comprise, for example, stabilizers, lubricants, fillers such as carbon black, graphite, metal flakes, titanium dioxide or zinc sulfide, reinforcing materials such as glass, carbon, aramid or metal fibers, plasticizers, colorants, flame retardants, impact modifiers or a mixture thereof. The proportion of the reinforcing materials in the molding compositions can be up to 50% by weight, that of the flame retardants up to 20% by weight and that of all other additives together up to 10%, in each case based on the total molding composition.

For the purposes of the present invention, a polyamide containing thermoplastic composition may also be a polyamide blend which is a molding composition which is comprised of polyamides and other polymers and also the additives customary for the polyamide molding compositions. The polymer constituents can be soluble in one another or one polymer constituent can be dispersed in the other or the two can form interpenetrating networks. Preferred polyamide blends for the purposes of the present invention are mixtures of polyamides and polyphenylene ethers in which the polyphenylene ether is dispersed in the polyamide. Such molding compositions are produced by melting and mixing at least 30% by weight of a polyamide, preferably at least 40 wt. %, more preferably at least 50 wt. %, based on the total weight of the molding composition with from 0 to 70% by weight, preferably 10 to 60 wt. %, more preferably 20 to 50 wt. % of a polyphenylene ether. Molding compositions based on polyamides and polyphenylene ethers are described, for example, in DE-A 30 27 104 and also in EP-A-147 874 and EP-A-O 024 120. It is known to a person skilled in the art that these molding compositions customarily contain a compatibilizer.

Further suitable polyamides may be impact-modified polyamides, e.g. polyamides having a rubber dispersed therein.

A fiber composite material having a polyamide matrix may also be used for the purposes of the present invention, which comprises uncut reinforcing fibers or fabrics on the one hand and a matrix comprising a polyamide, a polyamide molding composition or a polyamide blend on the other hand.

Fiber composite materials having a matrix comprising polyamides, polyamide molding compositions or polyamide blends can be produced in various ways, for example polyamide-impregnated reinforcing fibers or reinforcing fabrics, known as prepregs, can be consolidated by pressure and heat to form laminated sheets. It is also possible to process hybrid yarns of polyamide fibers and reinforcing fibers, or films of the thermoplastics mentioned and fabrics of reinforcing fibers under pressure and heat to form composite materials. Suitable reinforcing fibers are, for example, glass fibers, carbon fibers and aramid fibers.

The rubber compounds used according to the invention comprise a fluororubber (FPM) which can be prepared in a known manner. Suitable fluororubbers are described, for example, in K. Nagdi, Gummi-Werkstoffe, page 254 ff, Vogel-Verlag Wuerzburg 1981 and in The Vanderbilt Rubber Handbook, 13th Edition, pp. 211 ff, Vanderbilt Company Inc., Norwalk, Conn. 1990. Examples which may be mentioned are vinylidene fluoride-hexafluoropropene copolymers, vinylidene fluoride-hexafluoropropene-tetrafluoroethene terpolymers or vinylidene fluoride-tetrafluoropropene-perfluoro(methyl vinyl ether) terpolymers.

Suitable fluororubbers are produced, for example, by DuPont under the name Viton, by 3M under the trade name Fluorel, by Montefluos under the name Tecnoflon and by Daikin Kogyo Co., Japan under the name Dai-el. The selection of the type of rubber depends on the desired vulcanizate properties.

Apart from the rubber, the FPM mixtures can contain a limited number of additives such as fillers, color pigments, processing aids, lubricants or metal oxides as neutralizing agents for acids. They further comprise a vulcanizing agent.

Fillers which can be used are various carbon blacks and mineral fillers. As processing aid and plasticizer, it is possible to use, inter alia, liquid fluororubber. Suitable lubricants are, inter alia, carnauba wax and low molecular weight polyethylene. In general, metal oxides such as magnesium oxide are added to all FPM mixtures. These lead to a high degree of crosslinking and at the same time act as neutralizing agents for hydrogen fluoride which is formed during vulcanization.

Crosslinkers suitable for FPM mixtures are based, inter alia, on bisphenols and phosphonium compounds. These are often already present in the base polymer.

Types of FPM which do not contain a crosslinker are generally crosslinked using diamine compounds such as hexamethylenediamine carbonate or using organic peroxides in the presence of, for example, triallyl isocyanurate.

As regards suitable additives and crosslinkers, it is advisable to follow the advice of the FPM manufacturers, e.g. in the respective product brochures. The invention is not restricted to particular crosslinkers.

The articles comprising the polyamides, polyamide molding compositions or polyamide blends on the one hand and fluororubber compounds on the other hand can be produced in one or two stages. Articles comprising fiber composite materials and rubber compounds are produced in two stages.

In the two-stage process, the stiff molding is first produced by injection molding, extrusion or consolidation of prepregs and, in a second step, the possibly preshaped rubber compound is applied and the molding is exposed to the vulcanization conditions for the rubber. The application of the rubber to the stiff molding can be carried out by pressing, injection molding or extrusion.

In the two-stage injection molding process, the procedure is similar to that in the two-stage production of two-color injection moldings. The insert used is a molding made of the rigid materials mentioned. Barrel and screws of the injection molding machine are configured in a known way for rubber processing and the tool is treatable to the vulcanization temperature. If external mold release agents are used, care should be taken to ensure that they do not get into the interface between the materials since they can adversely affect adhesion in the composite.

For application of the rubber and vulcanization by the two-stage extrusion process, a profile produced in the first stage from a polyamide molding composition, e.g. a pipe, is, for example, sheathed with the rubber composition and vulcanized, if appropriate under pressure. Sheets comprising polyamide molding compositions or fiber composite materials having a polyamide matrix are processed correspondingly.

In the one-stage injection molding process, the procedure is analogous to the one-stage two-color injection molding process. In this case, one injection molding machine is equipped for thermoplastic processing, the other for rubber processing. The tool is heated to the prescribed vulcanization temperature which should be below the solidification temperature of the polyamide, the polyamide molding composition or the polyamide blend.

The optimum vulcanization conditions depend on the chosen rubber mixture, in particular its vulcanization system, and the shape of the molding. Thus, suitable temperatures in the tool are generally in the range from 140 to 210° C. If the softening range of the rigid component permits, temperatures in the upper part of this range, e.g. from 170 to 210° C., are selected. The vulcanization times depend on the rubber mixture and also on the vulcanization temperatures and the geometry of the parts. They are generally from 30 seconds to 30 minutes; lower temperatures and thicker rubber parts require longer times.

As a rough guide, the vulcanization is complete in from 2 to 15 minutes at temperatures of from 150° C. to 200° C.

The composites are generally, as is customary for fluoroelastomers, subsequently after-vulcanized; in the after-vulcanization, the prevulcanized parts are, for example, heated under atmospheric pressure in ovens with circulation of hot air and feeding-in of fresh air or nitrogen in order to complete the crosslinking reaction. Typical heating conditions are 24 hours at from 200 to 260° C.

The composite produced according to the invention is so strong that testing usually results in a cohesive fracture in the vulcanizate but not in separation at the phase interface.

The vulcanizates present in the composite bodies have excellent resistance to high temperatures, ozone, oxygen, mineral oils, fuels, aromatics and organic solvents.

Applications for the composites of the invention are, for example, rubber-coated rollers, flanges, pipe and hose couplings, sealing frames, seals, in particular shaft sealing rings, running rollers, clutch and brake disks, membranes and also coextruded pipes and hoses.

Experimental Part
1. The following polyamide molding compositions are used for the rigid component:
    1.1. Commercial polyamide 612 containing 20% by weight of short glass fibers.
    The ratio of amino end groups to carboxyl end groups is about 5:1.
    1.2. Blend of 50 parts by weight of PA 66 and 10 parts by weight of PA 6.3-T together with 40 parts by weight of short glass fibers. PA 6.3-T is prepared by polycondensation of terephthalic acid or terephthalic acid derivatives and trimethyl-substituted hexamethylene diamine. The ratio of $NH_2$ to COOH groups in this blend is about 5:1.
    1.3. Commercial PA 612 having a ratio of $NH_2$ to COOH groups of about 1:10 (not according to the invention).
    1.4. Similar to 1.2.; but the ratio of $NH_2$ end groups to COOH end groups is here about 1:6 (not according to the invention).
2. Rubbers used:
    2.1. Viton A
    This is a fluororubber from DuPont de Nemours, Geneva, Switzerland. The properties of the product may be found in the product information "Viton Fluororubber".
    2.2. Viton B 651 C
    This is a fluororubber (terpolymer) from DuPont de Nemours, Geneva, Switzerland, with an integrated crosslinker based on aromatic dihydroxy compounds. The properties of the product may be found in the product information "Viton Fluororubber".
    2.3. Dai-el G 763
    This is a fluororubber from Daikin Kogyo Co., Japan, with an integrated crosslinker based on aromatic dihydroxy compounds. The properties of the product may be found in the corresponding product information.
3. Rubber compounds:
    The rubbers used are mixed with additives; the composition of the compounds is shown in Table 1.

TABLE 1

Composition of the rubber mixtures

| Example | 3.1 | 3.2 | 3.3 | 3.4 |
|---|---|---|---|---|
| Rubber 2.1 | 100.0 | | | |
| Rubber 2.2 | | 100.0 | | |
| Rubber 2.3 | | | 100.0 | 100.0 |
| Maglite D 1) | | | 3.0 | 3.0 |
| Maglite Y 2) | 15.0 | 15.0 | | |
| Blance Fixe Micro 3) | | 15.8 | 10.0 | |
| Carbon black N 990 4) | 10.0 | | 5.6 | 25 |
| Lunacerra C 44 5) | | 2.0 | 0.1 | 0.5 |
| Diak No. 1 6) | 1.5 | | | |
| Calcium hydroxide | | | 6.0 | 6.0 |

Explanations for Table 1:
1) Maglite D is a high-activity magnesium oxide from Merck & Co. Inc., Rahway, New Jersey.
2) Maglite Y is a low-activity magnesium oxide from Merck & Co. Inc., Rahway, New Jersey.
3) Blance Fixe Micro is a barium sulfate as supplied by various manufacturers.
4) Carbon black N 990 is a low-activity carbon black which is supplied by Degussa AG, Hanau.
5) Lunacerra C 44 is a paraffin wax (hard wax).
6) Diak No. 1 is a crosslinker based on hexamethylenediamine carbamate from DuPont de Nemours, Geneva.

To demonstrate the bonding action, test specimens are produced by, as specified in DIN 53531, part 1, producing a plastic plate from the thermoplastic, covering one third of this with a Teflon film, laying a matching rubber sheet onto the plate, producing the composite by the pressing method and finally sawing out test specimens having a width of 25 mm. A peeling test is then carried out. In this test, the rubber part which has been kept separated from the polyamide material by means of the Teflon film during vulcanization is fixed in such a way that in the peeling tests the rubber strip is pulled off perpendicular to the thermoplastic surface. The results are shown in Tables 2 and 3.

TABLE 2

Properties of the composite materials of the invention; peeling test in accordance with DIN 53531/53539

| Example | Rubber | Polyamide material | Vulcanization temperature in ° C. | Vulcanization time in minutes | Separation force in N/mn |
|---|---|---|---|---|---|
| 4.1 | 3.1 | 1.1 | 180 | 10 | 7.7 |
| 4.2 | 3.1 | 1.2 | 200 | 5 | 8.1 |
| 4.3 | 3.2 | 1.1 | 180 | 10 | 6.4 |
| 4.4 | 3.3 | 1.2 | 200 | 5 | 7.5 |
| 4.5 | 3.4 | 1.1 | 180 | 10 | 8.0 |
| 4.6 | 3.4 | 1.2 | 200 | 5 | 8.2 |

In all tests, separation occurred in the vulcanizate layer (cohesive fracture) and not in the plastic/vulcanizate interface.

In contrast, for the two comparative molding compositions 1.3 and 1.4 satisfactory bonding strengths cannot be achieved, i.e. separation of the composite occurs in the plastic/vulcanizate interface without any great application of force, see Table 3.

TABLE 3

Composites not according to the invention; peeling test in accordance with DIN 53531/53539

| Example | Rubber | Polyamide material | Vulcanization temperature in ° C. | Vulcanization time in minutes | Separation force in N/mn |
|---|---|---|---|---|---|
| A | 3.1 | 1.3 | 180 | 10 | 1.7 |
| B | 3.1 | 1.4 | 200 | 5 | 1.1 |
| C | 3.2 | 1.3 | 180 | 10 | 1.4 |

Obviously, numerous modifications and variations of the present invention are possible in light of the above teachings. It is therefore to be understood that within the scope of the appended claims, the invention may be practiced otherwise than as specifically described herein.

This application is based on German patent application DE 197 18 504.5 filed in the German Patent Office on May 2, 1997, the entire contents of which are hereby incorporated by reference.

What is claimed as new and desired to be secured by Letters Patent of the United States is:

1. A method of producing an article comprising at least two subcomponents which are firmly joined to one another which comprise i) a vulcanizate and ii) a polyamide containing thermoplastic,
    wherein
    a) said polyamide containing thermoplastic comprises at least 30% by weight of a polyamide and in said polyamide at least 30% of the end groups are amino end groups;
    comprising vulcanizing a fluororubber compound while in contact with said polyamide containing thermoplastic at a vulcanization temperature below a solidification temperature of said polyamide containing thermoplastic, wherein said fluororubber does not have to be additionally functionalized or modified.

2. The method of claim 1, wherein at least 50% of the end groups in said polyamide are amino end groups.

3. The method of claim 1, wherein at least 70% of the end groups in said polyamide are amino end groups.

4. The method of claim 1, wherein said fluororubber compound further comprises a vulcanizing agent and an additive selected from the group consisting of a filler, a color pigment, a processing aid, a lubricant, a metal oxide or a mixture thereof.

5. The method of claim 1, wherein said composite is produced in a one-stage or a two-stage process in which the vulcanization temperature is in the range from 140 to 210° C.

6. The method of claim 1, wherein said polyamide containing thermoplastic comprises a polyamide and an additive selected from the group consisting of a stabilizer, a lubricant, a filler, a reinforcing material, a plasticizer, a colorant, a flame retardant, an impact modifier and a mixture thereof.

7. The method of claim 6, wherein said additive is a filler selected from the group consisting of carbon black, graphite, metal flakes, titanium dioxide, zinc sulfide and a mixture thereof.

8. The method of claim 6, wherein said additive is a reinforcing material selected from the group consisting of glass, carbon, aramid, metal fiber and a mixture thereof.

9. The method of claim 1, wherein said polyamide containing thermoplastic comprises a polyamide and a polymer other than a polyamide.

10. The method of claim 9, wherein said polyamide and said polymer other than a polyamide are soluble in one another.

11. The method of claim 9, wherein one of said polyamide or said polymer other than a polyamide are dispersed in the other.

12. The method of claim 9, wherein said polyamide and said polymer other than a polyamide form interpenetrating networks.

13. The method of claim 9, wherein said polymer other than a polyamide is a polyphenylene ether.

14. The method of claim 1, wherein said polyamide is selected from the group consisting of PA 46, PA 6, PA 66, PA 610, PA 612, PA 1012, PA 11, PA 12, PA 1212, PA 6.3-T, PEBA and a mixture thereof.

15. The method of claim 1, wherein said fluororubber compound is selected from the group consisting of vinylidene fluoride-hexafluoropropene copolymers, vinylidene fluoride-hexafluoropropene-tetrafluoroethene terpolymers, vinylidene fluoride-tetrafluoropropene-perfluoro(methyl vinyl ether) terpolymers and a mixture thereof.

16. The method of claim 1, wherein said fluororubber compound is a rigid material before vulcanization.

17. The method of claim 16, wherein the fluororubber is preshaped.

18. A method of producing an article comprising at least two subcomponents which are firmly joined to one another which comprise i) a vulcanizate and ii) a polyamide containing thermoplastic,
wherein
said polyamide containing thermoplastic comprises at least 30% by weight of a polyamide and in said polyamide at least 30% of the end groups are amino end groups;
comprising vulcanizing a fluororubber compound while in contact with said polyamide containing thermoplastic, wherein said fluororubber does not have to be additionally functionalized or modified.

19. The method of claim 18, wherein at least 50% of the end groups in said polyamide are amino end groups.

20. The method of claim 18, wherein at least 70% of the end groups in said polyamide are amino end groups.

21. The method of claim 18, wherein said fluororubber compound further comprises a vulcanizing agent and an additive selected from the group consisting of a filler, a color pigment, a processing aid, a lubricant, a metal oxide or a mixture thereof.

22. The method of claim 18, wherein said composite is produced in a one-stage or a two-stage process in which the vulcanization temperature is in the range from 140 to 210° C.

23. The method of claim 18, wherein said polyamide containing thermoplastic comprises a polyamide and an additive selected from the group consisting of a stabilizer, a lubricant, a filler, a reinforcing material, a plasticizer, a colorant, a flame retardant, an impact modifier and a mixture thereof.

24. The method of claim 23, wherein said additive is a filler selected from the group consisting of carbon black, graphite, metal flakes, titanium dioxide, zinc sulfide and a mixture thereof.

25. The method of claim 23, wherein said additive is a reinforcing material selected from the group consisting of glass, carbon, aramide, metal fiber and a mixture thereof.

26. The method of claim 18, wherein said polyamide containing thermoplastic comprises a polyamide and a polymer other than a polyamide.

27. The method of claim 26, wherein said polyamide and said polymer other than a polyamide are soluble in one another.

28. The method of claim 26, wherein one of said polyamide or said polymer other than a polyamide are dispersed in the other.

29. The method of claim 26, wherein said polyamide and said polymer other than a polyamide form interpenetrating networks.

30. The method of claim 26, wherein said polymer other than a polyamide is a polyphenylene ether.

31. The method of claim 18, wherein said polyamide is selected from the group consisting of PA 46, PA 6, PA 66, PA 610, PA 612, PA 1012, PA 11, PA 12, PA 1212, PA 6.3-T, PEBA and a mixture thereof.

32. The method of claim 18, wherein said fluororubber compound is selected from the group consisting of vinylidene fluoride-hexafluoropropene copolymers, vinylidene fluoride-hexafluoropropene-tetrafluoroethene terpolymers, vinylidene fluoride-tetrafluoropropene-perfluoro(methyl vinyl ether) terpolymers and a mixture thereof.

33. The method of claim 18, wherein said fluororubber compound is a rigid material before vulcanization.

34. The method of claim 33, wherein the fluororubber is preshaped.

* * * * *